United States Patent [19]

Kissinger et al.

[11] Patent Number: 4,488,813

[45] Date of Patent: Dec. 18, 1984

[54] REFLECTIVITY COMPENSATING SYSTEM FOR FIBER OPTIC SENSOR EMPLOYING DUAL PROBES AT A FIXED GAP DIFFERENTIAL

[75] Inventors: Curtis Kissinger, Gloversville; Richard Dorman, Troy, both of N.Y.

[73] Assignee: Mechanical Technology Incorporated, Latham, N.Y.

[21] Appl. No.: 373,112

[22] Filed: Apr. 29, 1982

[51] Int. Cl.³ .............................. G01B 11/14
[52] U.S. Cl. .................... 356/375; 250/227
[58] Field of Search ............ 376/1, 4, 375; 250/227

[56] References Cited

U.S. PATENT DOCUMENTS

| | | | |
|---|---|---|---|
| 3,327,584 | 6/1967 | Kissinger et al. | 250/227 |
| 3,455,625 | 7/1969 | Brumley et al. | 350/96 |
| 3,562,539 | 2/1971 | Beroza et al. | 250/227 |
| 3,784,309 | 1/1974 | Brelot et al. | 356/375 |
| 3,940,608 | 2/1976 | Kissinger et al. | 250/227 |
| 4,210,029 | 7/1980 | Porter | 73/705 |
| 4,247,764 | 1/1981 | Kissinger | 250/205 |
| 4,254,331 | 3/1981 | Dorman et al. | 250/205 |
| 4,358,960 | 11/1982 | Porter | 356/375 |

FOREIGN PATENT DOCUMENTS 103310  8/1981  Japan ......................... 356/375

Primary Examiner—R. A. Rosenberger
Attorney, Agent, or Firm—Joseph V. Claeys; Arthur N. Trausch, III

[57] ABSTRACT

This invention provides for the use of two similar fiber optic probes set at a fixed position differential relative to each other in order that a calibration correction signal can be obtained which may be used to create a common output signal having a gap calibration which is independent of surface reflectance.

4 Claims, 4 Drawing Figures

REFLECTIVITY COMPENSATING SYSTEM FOR FIBER OPTIC SENSOR EMPLOYING DUAL PROBES AT A FIXED GAP DIFFERENTIAL

FIELD OF THE INVENTION

This invention relates to proximity instruments and, more particularly, to a fiber optic proximity instrument having automatic adjustment for changes in the intensity of the reflected light.

BACKGROUND OF THE INVENTION

There presently exists fiber optic sensors which utilize optic fibers and proximity probes which use light transmitted from a light source by way of a bundle of these light conducting optical fibers to a target. The light is reflected off the target and returned along other optical fibers in the bundle back to a light intensity sensor. The intensity of the returning light is a function of the distance between the proximity probe tip and the target, so the output of the light sensor can be a very precise measure of that distance. Typical examples of such sensors can be found in U.S. Pat. No. 3,327,584 issued June 27, 1967; No. 3,940,608 issued Feb. 24, 1976; and 4,247,764 issued Jan. 27, 1981, all hereby incorporated by reference.

Initially, the gap measuring instrument is normalized such that the optic peak of the characteristic curve for that probe corresponds to a 100% or full scale output calibration.

Because of variations in certan operating parameters, particularly reflectivity of the target, transmission efficiency of the fiber optic bundle, and other factors which influence the intensity of the light transmitted and reflected, it is necessary to readjust the instrument, by adjusting light source intensity if any one of these factors are changed during operation. Changing the relative position between the fiber optic bundle tip and the target is necessary to determine if reflectivity variations have affected the instrument, but the position change itself will not compensate for the reflectivity change. Although provisions for this readjustment may be included in the device, they usually are expensive, limited in range, or require special probes. This of course is aside from the situation in certain applications where the need to readjust the instrument for each use is more than merely cumbersome, but impossible, thereby limiting the application of such devices. This is particularly evident in situations where the instrument is in an inaccessible location or where its readings must be available continuously or at unpredictable intervals. Other situations require the permanent mounting of the instrument probe relative to a target.

There exists a need to have a system not requiring readjustment heretofore necessary whenever the operating parameters, particularly the reflectivity of the target changes.

DESCRIPTION OF THE DRAWINGS

The invention and its attendant objects and advantages will become better understood by reference to the following description of the preferred eembodiment when taken in conjunction with the following drawings, wherein.

DETAILED DESCRIPTION OF THE PREFERRED EMBODIMENT

Figure 1:
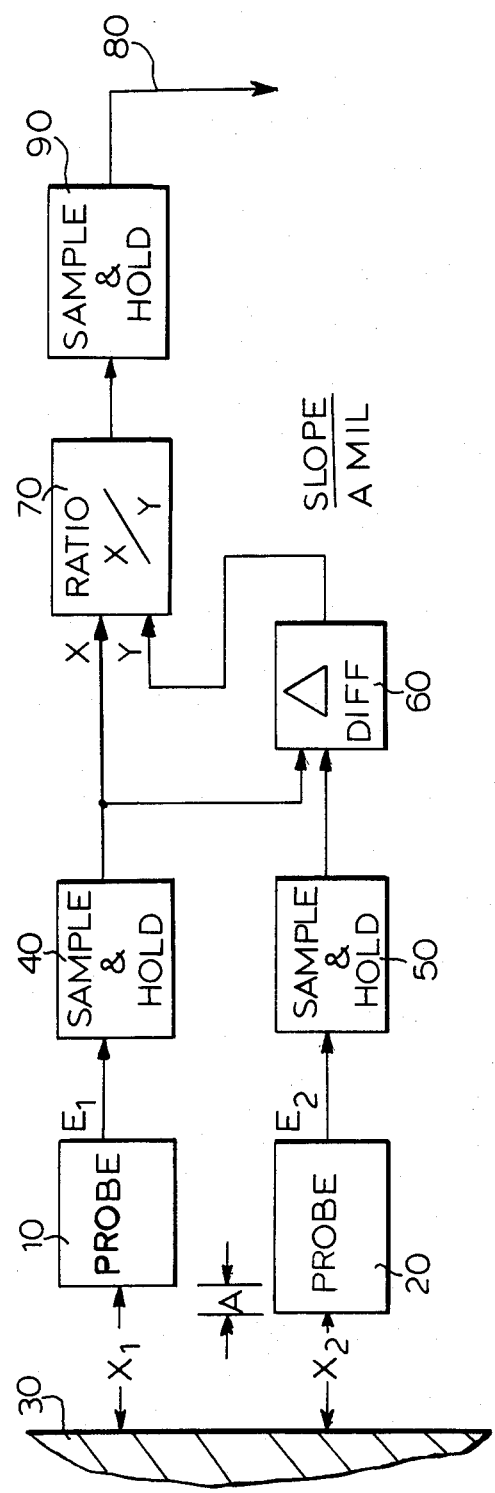
FIG. 1 is a schematic diagram of the preferred embodiment of the invention, incorporating the teachings of the present invention.

With reference now to FIG. 1, the invention comprises a first probe 10 and a second probe 20 which may advantageously be of a standard variety and are of a similar type, such as disclosed in U.S. Pat. No. 3,327,584, hereby incorporated by reference. Probe 10 is at a variable distance $X_1$ and probe 20 is at variable distance $X_2$ from a target 30, however, the difference between $X_1$ and $X_2$ is always predetermined and indicated by the distance A. As aforenoted, a fiber optic sensor is based upon the principal that light is generated toward a target in a known amount, and reflected therefrom on to a probe which is coupled to a sensor. This sensor usually provides an output (voltage) corresponding to the amount of light collected (which is a percentage of that transmitted), with this amount dependent upon the distance or gap of the probe from the target.

Accordingly due to the gap difference, the probes provide two outputs, labelled $E_1$ and $E_2$ respectively, which correspond to the amount of light each receives as a function of their respective gaps. These outputs are coupled to two sample and hold circuits 40 and 50 which in turn have their outputs coupled with a difference circuit 60, whose output is equal to the difference of the outputs of the sample and hold circuits.

The output of the sample-and-hold circuit 40 and the output of the diffrnce circuit 60 are then fed into a dividing circuit 70. This dividing circuit 70 has its output fed to a third sample-and-hold circuit 90. The output of this sample-and-hold circuit provides an output 80 which is equal to the ratio of the output of the first sample-and-hold circuit 40 and the difference circuit 60.

Through the foregoing arrangement, the output 80 is proportional to the distance $X_1$ from the first probe 10 to the target 30 independent of the target reflectivity due to the use of the fixed differential gap between the probes.

Figure 2:
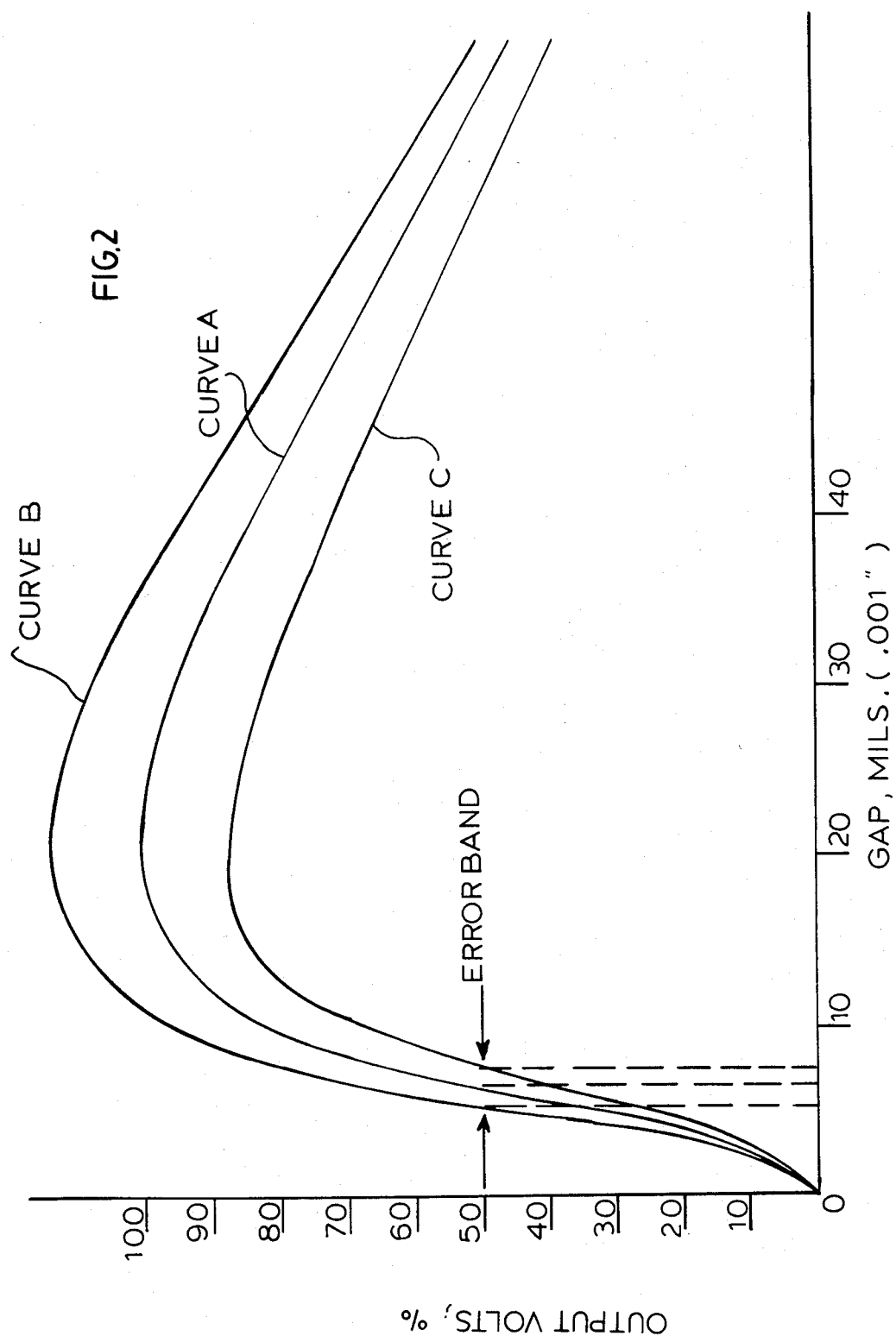
FIG. 2 is a graphic representation of the output of a typical probe as a function of distance and reflectivity.

In this regard, and with reference to FIG. 2, there is shown a graph representation of the output realized by a typical probe without compensation in a situation that the target's reflectivity changes. Curve A shows the typical front side slope response characteristic of a fiber optic sensor after manually adjusting the light intensity to give 100% output when the probe gap corresponds to the optical peak area. Curves B and C show what happens to the output signal if the target surface reflectance changes (high and low respectively) and no lamp intensity adjustment is made to reset the systems output to 100% at the optical peak. If the lamps intensity were reset to give 100% at the optical peaks, curves B and C would fall coincident with curve A, thus indicating true gap/voltage information.

Note that the gap distance from the target is represented by the horizontal axis (x) in mils and the output of the probe by the vertical axis (y) in a percentage or volts. As can be seen, for example, the output of the probe varies with reflectivity. Without adjustment for reflectivity, for the same output i.e., 50%, three different gaps are possible, as shown in FIG. 2.

Figure 3:
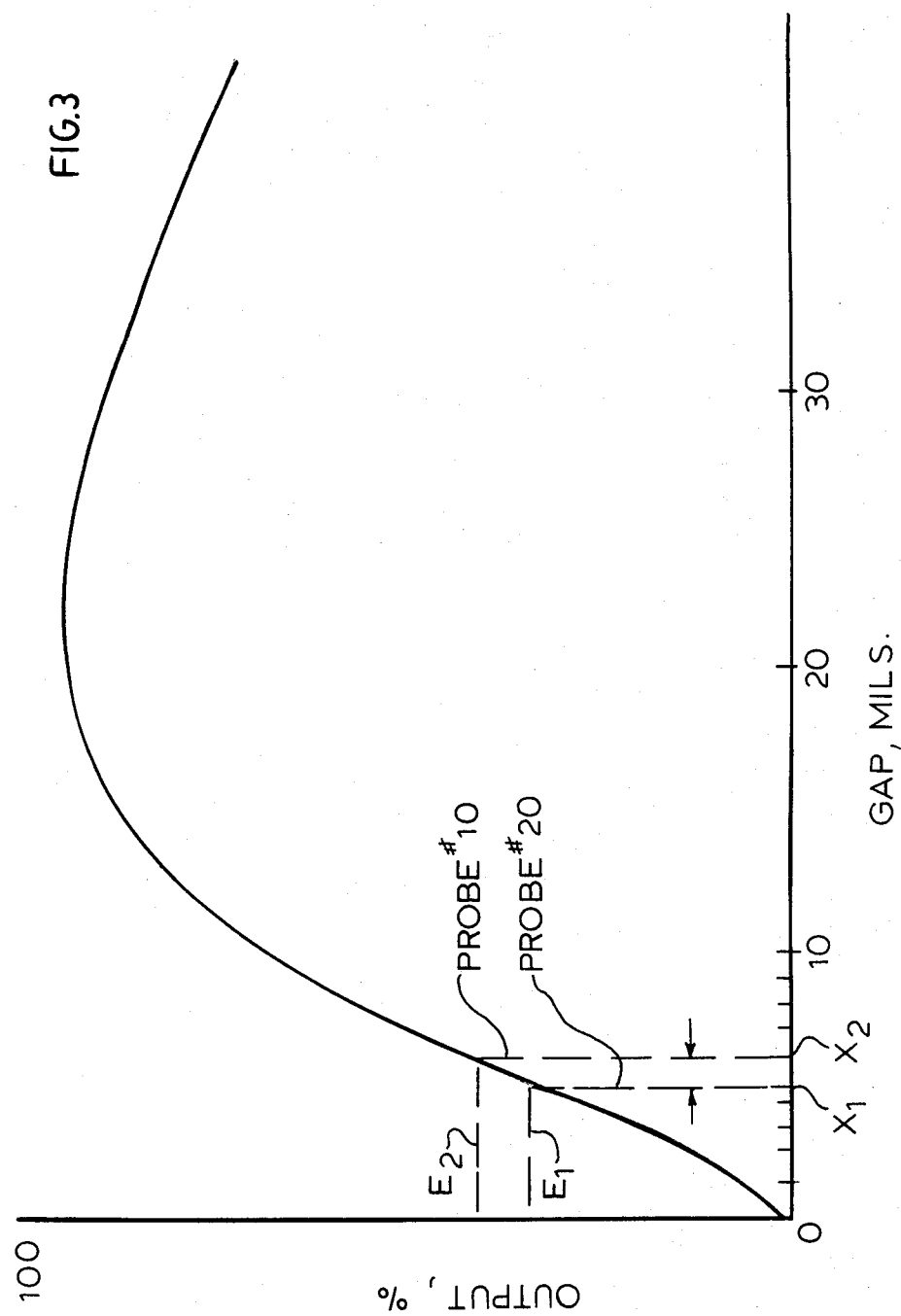
FIG. 3 is a graphic representation of the compensating functioning of the invention.

However, in the present invention after normalizing for a fixed input of light i.e., 100% output at the optical peak, any change in reflectivity can be compensated for. In this regard, a response of a typical probe is reproduced in FIG. 3, which represents 10% output at the optical peak. The invention however applies to all characteristic curves generated under various operating parameters. Probes 10 and 20 are situated at fixed but different distances from the target, represented respectively by $X_1$ and $X_2$, with the probes generating respective responses $E_1$ and $E_2$. It can be seen from this figure that the response of the probes are positioned within the linear portion of the front side slope of the characteristic curve within certain limits. The responses may also be positioned in the back side linear portion. In general, the output of the probe is proportional to the distance i.e.

$$E_1 = MX_1 \quad (1)$$

where M equals the slope of the linear portion of the characteristic curve.

If probe 10 is used at $X_1$ and simultaneously a second probe 20 is used at $X_2$, a predetermined distance (A) away from $X_1$, then their outputs $E_1$, $E_2$ and the difference $X_2 - X_1$ are also known. Therefore, the above expression can be rewritten as:

$$E = \frac{E_2 - E_1}{X_2 - X_1} X = \frac{E_2 - E_1}{A} X \quad (2)$$

Thus, $$M = \frac{E_2 - E_1}{A}$$

where the slope constant M has been determined by sensing the difference between $E_1$ and $E_2$ that is produced by the known probe distance difference A while the probes are in their linear range.

Therefore, the expression (2) may be used to obtain $X_1$ as follows:

$$X_1 = \frac{E_1}{M} = A \times \frac{E_1}{E_2 - E_1}$$

Accordingly, this distance can be determined independent of the target reflectivity in a simple and yet effective manner by using simple circuitry to provide the aforenoted rationing and differencing.

In the simplest realization of this device, the target is stationary and the two probes always have the same target in their sensing view. With this target configuration, the sample-and-hold circuitry, 40 and 50 of FIG. 1, is not needed. A continuous measurement of the two target signals is performed and the compensation is carried out using the difference circuit 60 and the ratio circuit 70 as described in the previous embodiment. The device works best in this configuration if the areas in front of the two probes have identical target reflectivities. The sample-and-hold amplifiers would be replaced with a direct connection or the sample-and-hold circuits could be left in the system with each connected so they always have a sample mode.

Figure 4:
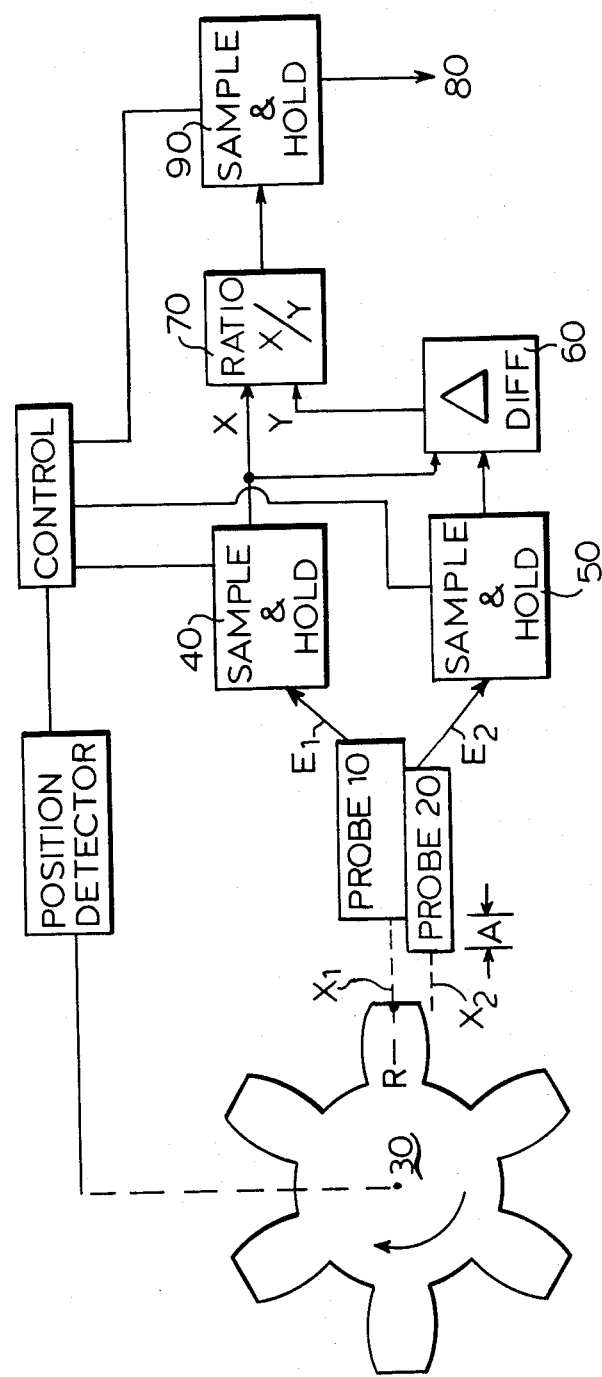
FIG. 4 shows another embodiment of the invention.

Another embodiment of this device is shown in FIG. 4, whereby the sample-and-hold circuits may be triggered in sequence in order to view the same reflective point, such as would occur on a repetitive oscillation or rotational cycle. The target configuration 30 of this device is a discontinuous target that is continuously moving, for example oscillating or rotating in front of the probe. In FIG. 4 a rotating target, for example the rotor of a turbine, is shown. The sample-and-hold circuits are normally in their hold modes. The circuits are sequentially switched into the sample mode momentarily when a specific target area "R" is in front of each probe. This area is the area that is to be sensed for movement or vibration. There may be several of these target areas around the periphery of the target. The normal time sequence of the operation of the sample-and-hold circuits for the configuration shown in FIG. 4 is:

T1—All sample-and-hold circuits are in the hold modes and the target R is rotating towards the probes.

T2—Target R moves in front of probe 10. The sample-and-hold circuit 40 is in the sampling mode while R is directly in front of probe 10. The circuit is placed in the hold mode as target R moves out of the sensing view of the probe.

T3—Target R is in front of probe 20. The sample-and-hold circuit 50 is in the sample mode while R is directly in front of the probe. The sample-and-hold circuit is placed in the hold mode as R moves out of the sensing view of the probe.

T4—Target R moves away from probe 20. The sample-and-hold circuit 90 is placed momentarily in the sample mode to sense the ratio output due to the updated sample signals stored in 40 and 50.

This sequence can be perfomed as many times as required for the desired target areas around the periphery of a rotating or oscillating target.

The sample-and-hold circuits are controlled by an electronic circuit that senses the rotational position of a target using an encoder or position detector that is connected to the rotating target. The control settings on the electronic circuit allow the timing of the sample control pulses to the sample-and-hold circuits to be set so that information from the target areas are sensed properly.

Thus by the present invention the aforenoted objects and advantages are readily realized, and although a preferred embodiment has been disclosed and described in detail herein, its scope should not be limited thereby, rather its scope should be determined by that of the appended claims.

What is claimed is:

1. An optical system for determining the position of a target, said system comprising:

a first fiber optic proximity probe at a variable distance $X_1$ from the target and capable of generating an output $E_1$ corresponding to the amount of light reflected by the target to the probe over distance $X_1$;

a second fiber optic proximity probe at a variable distance $X_2$ from the target and capable of generating an output $E_2$ corresponding to the amount of light reflected by the target to the probe over distance $X_2$;

said probes are disposed at different distances from the target in such a manner that the difference between said distances is predetermined; and means for determining $X_1$ in accordance with the following equation:

$$X_1 = A \times \frac{E_1}{E_2 - E_1}$$

wherein $X_1$ is the distance from the first probe to the target, A is the difference in the distance of the two probes from the target, and $E_1$ and $E_2$ are both in the linear range of the common response curve for the light reflected by the target to the probes.

2. The system in accordance with claim 1 wherein the determining means comprises sample-and-hold circuit means for retaining the outputs $E_2$ and $E_1$ of the probes, difference means capable of providing an output $E_2-E_1$; and ratioing means capable of determining $E_1/(E_2-E_1)$.

3. The system in accordance with claim 2, wherein said target is rotating and said determining means further comprises a position detector connected to the rotating target and a control means triggered by the position detector such that the sample-and-hold circuit means for retaining the outputs $E_1$ and $E_2$ of the probes are each activated as the target rotates in front of the probes.

4. A method of determining the position of a target, comprising the following steps:

generating a first signal $E_1$ in the linear range of a response curve corresponding to the reflection of light from the target to a first fiber optic proximity probe at a first variable distance $X_1$ from the target;

generating a second signal $E_2$ in the linear range of the same response curve corresponding to the reflection of light from the target to a second fiber optic proximity probe at a second variable distance $X_2$ from the target;

generating an output which corresponds to the ratio $E_1/(E_2-E_1)$ and determining the distance $X_1$ in accordance with the equation:

$$X_1 = A \times \frac{E_1}{E_2 - E_1}$$

wherein $X_1$ is the distance from the first probe to the target, and A is the difference in the distance of the two probes from the target.

* * * * *

UNITED STATES PATENT AND TRADEMARK OFFICE
CERTIFICATE OF CORRECTION

PATENT NO. : 4,488,813
DATED : Dec. 18, 1984
INVENTOR(S) : Curtis Kissinger, Richard Dorman It is certified that error appears in the above-identified patent and that said Letters Patent is hereby corrected as shown below:

Column 3, line 5, "represents 10%"
      should be --represents 100%--

Column 3, line 49, "rationing"
      should be --ratioing--

Signed and Sealed this

Thirtieth Day of April 1985

[SEAL]

Attest:

DONALD J. QUIGG

Attesting Officer     Acting Commissioner of Patents and Trademarks